(12) United States Patent
Erceg et al.

(10) Patent No.: US 8,919,529 B1
(45) Date of Patent: Dec. 30, 2014

(54) DUAL-POSITION CHUTE FOR PARCEL HANDLING

(75) Inventors: David Patrick Erceg, Concord, NC (US); Gonzalo Sotelo, Charlotte, NC (US); Christopher K. Sales, Rock Hill, SC (US)

(73) Assignee: Mantissa Corporation, Charlotte, NC (US)

(*) Notice: Subject to any disclaimer, the term of this patent is extended or adjusted under 35 U.S.C. 154(b) by 217 days.

(21) Appl. No.: 13/614,579

(22) Filed: Sep. 13, 2012

Related U.S. Application Data

(60) Provisional application No. 61/534,912, filed on Sep. 15, 2011.

(51) Int. Cl.
 *B65G 47/34* (2006.01)
 *B65G 47/44* (2006.01)
 *B65G 47/96* (2006.01)
 *B65G 11/12* (2006.01)
 *B65G 11/20* (2006.01)

(52) U.S. Cl.
 CPC ............ *B65G 11/123* (2013.01); *B65G 11/203* (2013.01)
 USPC .................. 198/360; 198/370.03; 198/369.5; 198/802

(58) Field of Classification Search
 None
 See application file for complete search history.

(56) References Cited

U.S. PATENT DOCUMENTS

| | | | |
|---|---|---|---|
| 4,744,454 A | 5/1988 | Pölling | 198/365 |
| 4,927,006 A * | 5/1990 | Dolan | 198/822 |
| 5,054,601 A | 10/1991 | Sjogren et al. | 198/365 |
| 5,086,905 A | 2/1992 | Pölling | 198/365 |
| 6,050,390 A | 4/2000 | Fortenbery et al. | 198/370.03 |
| 6,095,314 A | 8/2000 | Fortenbery | 198/360 |
| 6,227,377 B1 | 5/2001 | Bonnet | 209/650 |
| 6,367,610 B1 | 4/2002 | Fortenbery et al. | 198/370.04 |
| 6,499,582 B1 * | 12/2002 | Gillott | 198/360 |
| 6,715,599 B1 | 4/2004 | Fortenbery et al. | 198/360 |
| 7,156,220 B2 * | 1/2007 | Olson et al. | 198/465.1 |
| 7,597,185 B1 | 10/2009 | Fortenbery et al. | 198/493 |

* cited by examiner

*Primary Examiner* — Kavel Singh
(74) *Attorney, Agent, or Firm* — MacCord Mason PLLC

(57) ABSTRACT

A dual position chute for parcel handling. In one embodiment, the device comprises a conveying track, an unloading station and a transition zone dual-position chute that is adapted to divert a package from an adjacent conveying track and between at least two substantially vertical discharge positions. In some examples, the chute includes an inlet, a positionable diverter door and at least one spatially-separated stationary diverter door that is downstream from the positionable diverter door. The system and chute provides for discharge of small parcels from an adjacent packing sorting conveyor.

25 Claims, 9 Drawing Sheets

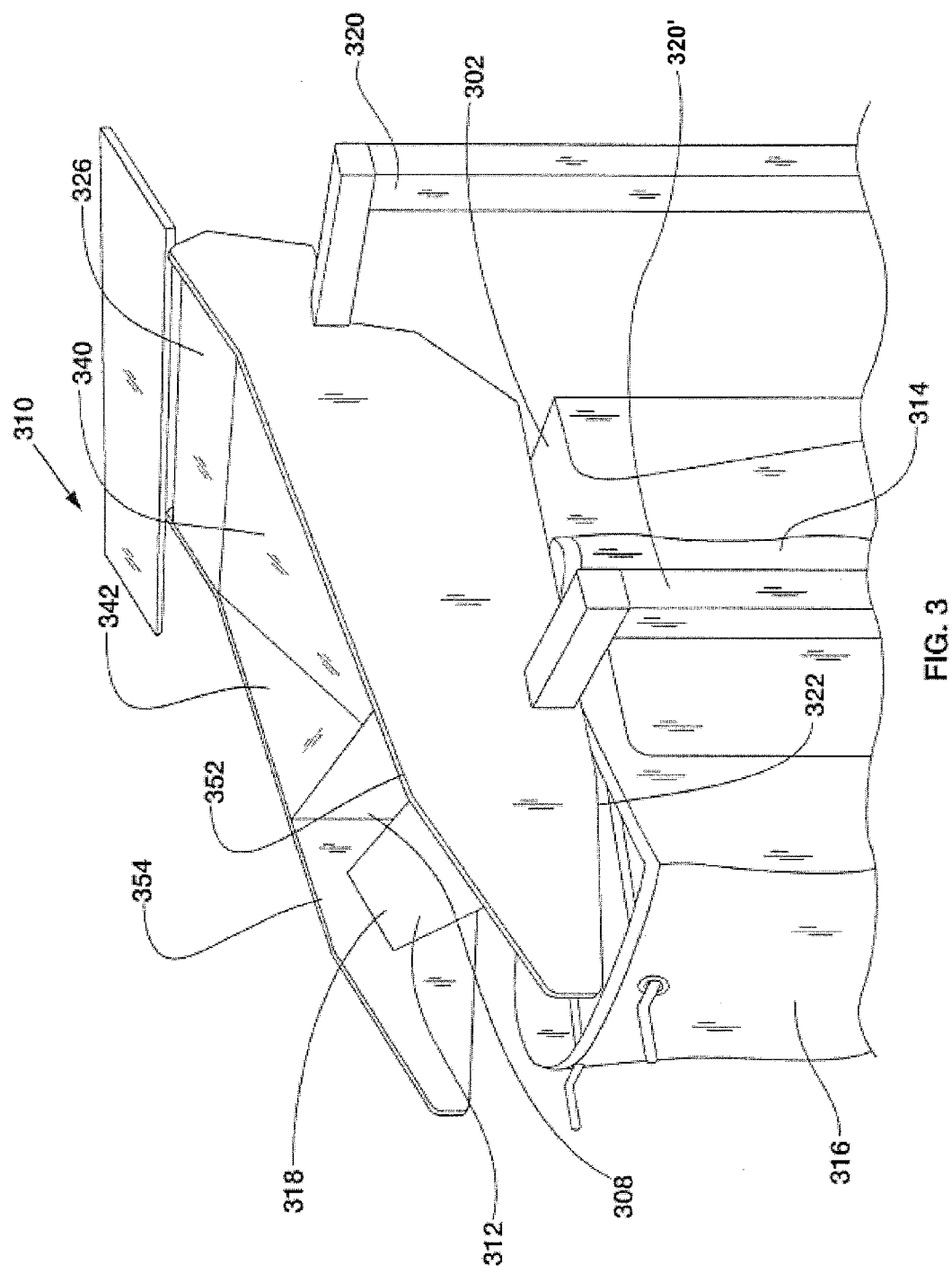

DUAL-POSITION CHUTE FOR PARCEL HANDLING

This non-provisional utility application claims the benefit of provisional application No. 61/534,912, filed Sep. 15, 2011, and which is hereby incorporated by reference in its entirety.

BACKGROUND

1. Field

The present inventions relate generally to package sorting conveyor systems, and more particularly to a dual-position unloading station for parcel handling.

2. Related Art

Conveyor systems having a number of individual carrying carts have been used for many years to carry and sort packages, such as shoes, apparel and other items such as mail. Typically, a package sorting conveyor includes a train of carts coupled in tandem to form a continuous loop. Often, each cart includes a pivotally-mounted tilt tray that is maintained in an upright position until the cart reaches a selected discharge location. When the cart reaches the discharge location, for instance such as an outfeed chute, an actuator, or the like, may tilt the tray to dump the package into the individual discharge location. Typically, these conventional tilt tray sorters discharge their goods onto individual chutes located near each packer.

Package-conveying systems, including systems having multiple discharge chutes adapted to convey a variety of items, have been developed for such parcel handling. Similarly, transition zone funnels have been developed to help with selectively depositing the items into a designated chute at a predetermined discharge location. However, such systems and methods lack versatility and require a significant footprint of floor space, especially when sorting a variety of packaging items.

Thus, there remains a need for new and improved systems and methods for improved package sorting conveyors, particularly those discharging small parcels, for efficient transition zone package sorting while, at the same time, avoiding drawbacks presented by the traditional systems and methods.

SUMMARY

In accordance with the present inventions, a dual-position transition chute is provided for a package sorting conveyor system. These inventions provide an improved conveyor system that is convenient, efficient and safe for the user, particularly when used to discharge small parcels from a conveyor system.

One aspect of the present inventions is to provide a transition zone dual-position chute for receiving a package discharged at an unloading station by a package sorting conveyor system having a conveyor track. In some embodiments, the transition zone dual-position chute includes an inlet that is adjacent to the conveying track at the unloading station for receiving the package; a positionable diverter door; and at least one stationary diverter door that is spatially separated downstream from the positionable diverter door. Typically, the inlet is adjacent to the conveying track at the unloading station for receiving the package. The at least one stationary diverter door is generally downstream from the positionable diverter door. In addition, the spacer is typically between the positionable diverter door and the at least one stationary diverter door.

In some examples, the inlet is substantially flat to receive the package being discharged by the package sorting system. Further, the inlet may be wider than the front edge of the package providing a wider range of curvature enabling the package to slide off the package sorting conveyor system onto the inlet.

In other examples, the positionable diverter door includes a downstream inclined diverting surface. The inclined diverting surface may be substantially wider at a distal exit than at a proximate entrance. Typically, the positionable diverter door typically is selectively positionable along at least two non-parallel axes. Further, the positionable diverter door may include a low-friction, wear-resistant discharge surface. The discharge surface may be a high-density polyethylene.

In particular, examples, the stationary diverter door may be substantially planar with the positionable diverter door in a second discharge position. Further, the stationary diverter door may include a downstream inclined diverting surface. The inclined diverting surface may be substantially wider at a distal exit than at a proximate entrance. The stationary diverter door may also comprise a low-friction, wear-resistant discharge surface. For instance, the discharge surface may be a high-density polyethylene.

In yet other examples, the spacer aligns the positionable diverter door and the at least one stationary diverter door in a second discharge position. The chute may also include a sidewall assembly. The sidewall assembly may include an upstream sidewall substantially along the length of the chute. Further, the sidewall assembly may include an opposing sidewall extending downstream of the positionable diverter door.

In other examples, the chute includes a fixed base assembly supporting the chute. The fixed base assembly may include at least one vertical support. The chute may also include a collector assembly that is positioned along at least a first substantially vertical discharge and a second substantially vertical discharge. The collector assembly may include a first collector at the first substantially vertical discharge. In addition, the collector assembly may include a second collector at the second substantially vertical discharge.

In another embodiment, a package sorting conveyor system may have a conveying track, at least one unloading station and a transition zone dual-position chute. Typically, the transition zone dual-position chute to receive the package from the conveying track and includes at least one diverter door. The at least one diverter door may selectively divert the package between a first substantially vertical discharge and a spaced second substantially vertical discharge.

In some examples, the package sorting conveyor system includes a positioner assembly for selectively positioning the at least one diverter door between the first discharge and the spaced second discharge. The positioner assembly may include a counterbalance system. For instance, the positioner assembly is adapted to position the diverter door along at least two non-parallel axes. Further, the positioner assembly may include at least one pivot point. The at least one pivot point may be ball joint, an inclined axis or a combination thereof. In yet other examples, the at least one pivot point may comprise at least two independent pivots. For instance, the two independent pivots may be a rotary joint and a hinge joint.

In yet other examples, the positioner assembly may include a drive assembly. The drive assembly may include a linear actuator. For instance, the linear actuator may be a fluid actuator.

In another embodiment, a package sorting conveyor system comprises a conveying track, at least one unloading station, a transition zone dual-position chute to receive the package from the conveying track and a positioner assembly for selectively positioning the positionable diverter door. Typically, the positioner assembly selectively positions the diverter door between a first substantially vertical discharge position and at least one spaced second substantially vertical discharge position. The transition zone dual-position chute may have an inlet adjacent to the conveying track at the unloading station for receiving the package, a positionable diverter door, at least one stationary diverter door downstream from the positionable diverter door and a spacer between the positionable diverter door and the at least one stationary diverter door.

In some examples, the inlet is substantially flat to receive the package being discharged by the package sorting system. Further, the inlet may be wider than the front edge of the package providing a wider range of curvature enabling the package to slide off the package sorting conveyor system onto the inlet.

In other examples, the positionable diverter door includes a downstream inclined diverting surface. The inclined diverting surface may be substantially wider at a distal exit than at a proximate entrance. Typically, the positionable diverter door typically is selectively positionable along at least two non-parallel axes. Further, the positionable diverter door may include a low-friction, wear-resistant discharge surface. The discharge surface may be a high-density polyethylene.

In particular examples, the stationary diverter door may be substantially planar with the positionable diverter door in a second discharge position. Further, the stationary diverter door may include a downstream inclined diverting surface. The inclined diverting surface may be substantially wider at a distal exit than at a proximate entrance. For instance, the distal exit of the diverting surface may extend into the stationary diverter door. The stationary diverter door may also comprise a low-friction, wear-resistant discharge surface. For instance, the discharge surface may be a high-density polyethylene.

In yet other examples, the spacer aligns the positionable diverter door and the at least one stationary diverter door in a second discharge position. The chute may also include a sidewall assembly. The sidewall assembly may include an upstream sidewall substantially along the length of the chute. Further, the sidewall assembly may include an opposing sidewall extending downstream of the positionable diverter door.

In other examples, the chute includes a fixed base assembly supporting the chute. The fixed base assembly may include at least one vertical support. The chute may also include a collector assembly that is positioned along at least a first substantially vertical discharge and a second substantially vertical discharge. The collector assembly may include a first collector at the first substantially vertical discharge. In addition, the collector assembly may include a second collector at the second substantially vertical discharge.

The above summary is intended to summarize certain embodiments of the present inventions. Embodiments will be set forth in more detail in the figures and description of embodiments below. It will be apparent, however, that the description of embodiments is not intended to limit the present inventions, the scope of which should be properly determined by the appended claims.

BRIEF DESCRIPTION OF THE DRAWINGS

Embodiments of the inventions will be better understood by a reading of the Description of the Embodiments along with a review of the drawings, in which:

FIG. 3 is a side perspective view of the embodiment of FIG. 2A;

DESCRIPTION OF THE EMBODIMENTS

Figure 1:
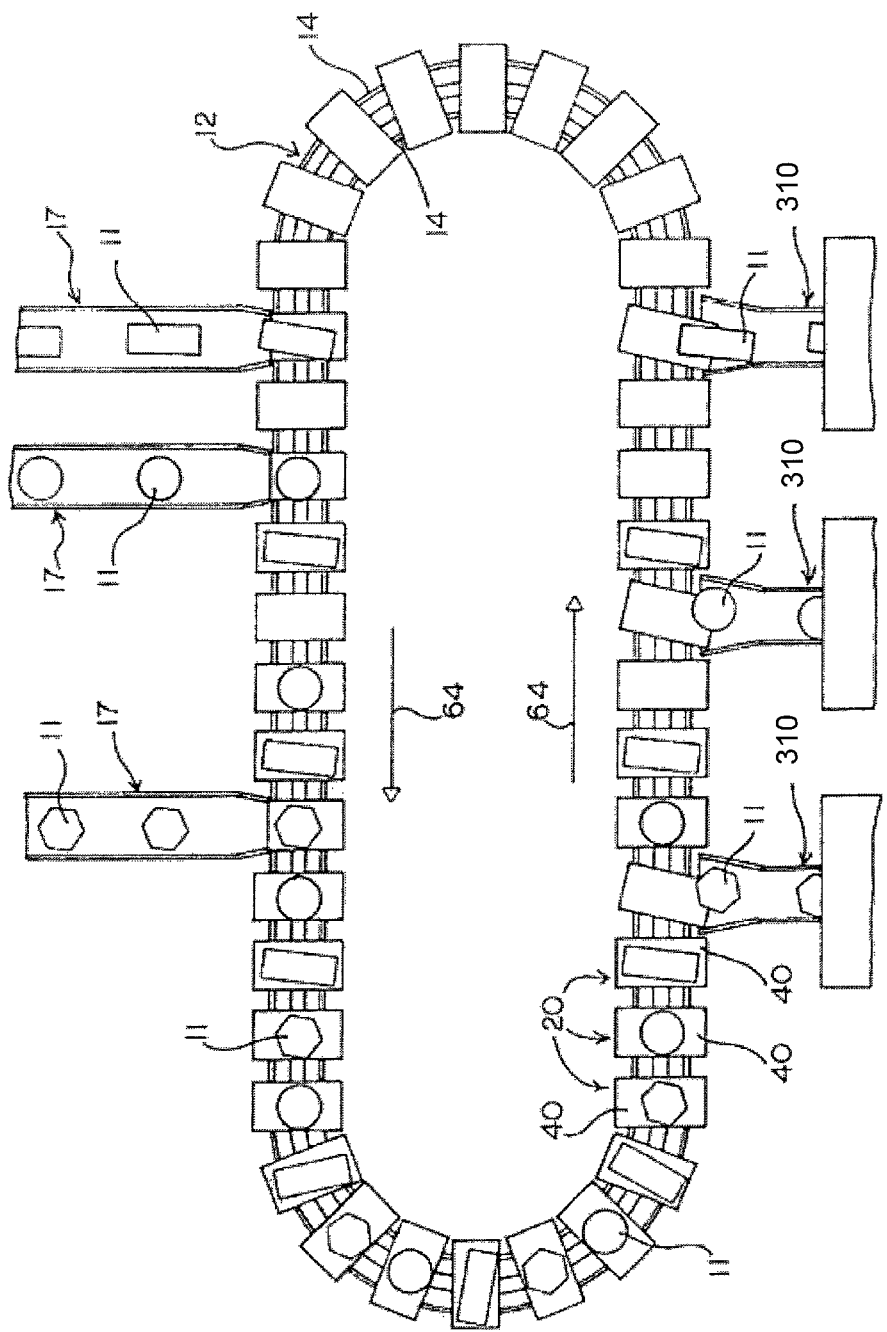
FIG. 1 is a top view of a conveying system according to an embodiment constructed according to the present inventions.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Figure 2A:
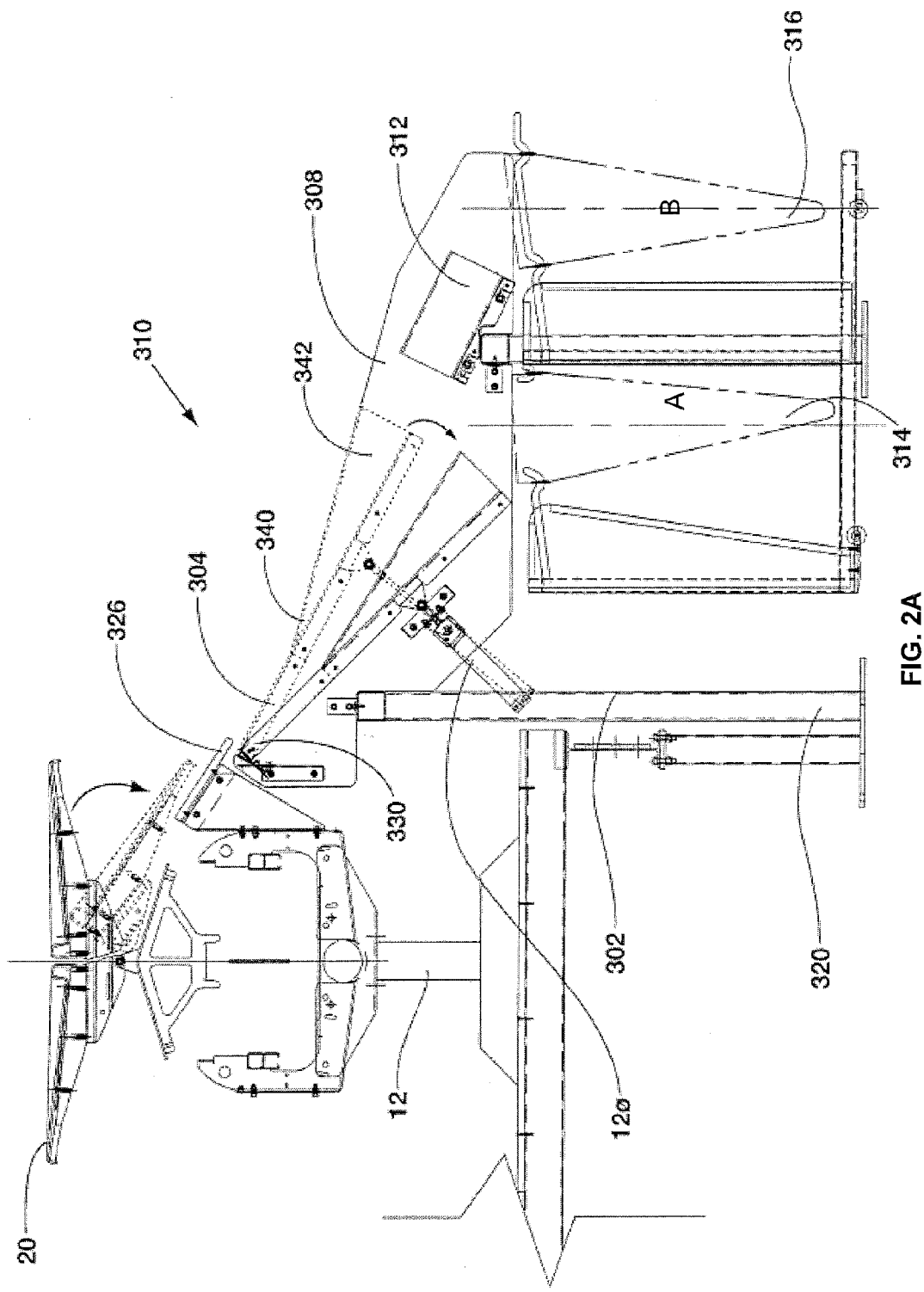
FIG. 2A is a side view of the embodiment of FIG. 1, where a dual-position chute is positioned adjacent to the line of conveyor carts, previously introduced in FIG. 1, in a first vertical discharge position.
Figure 2B:
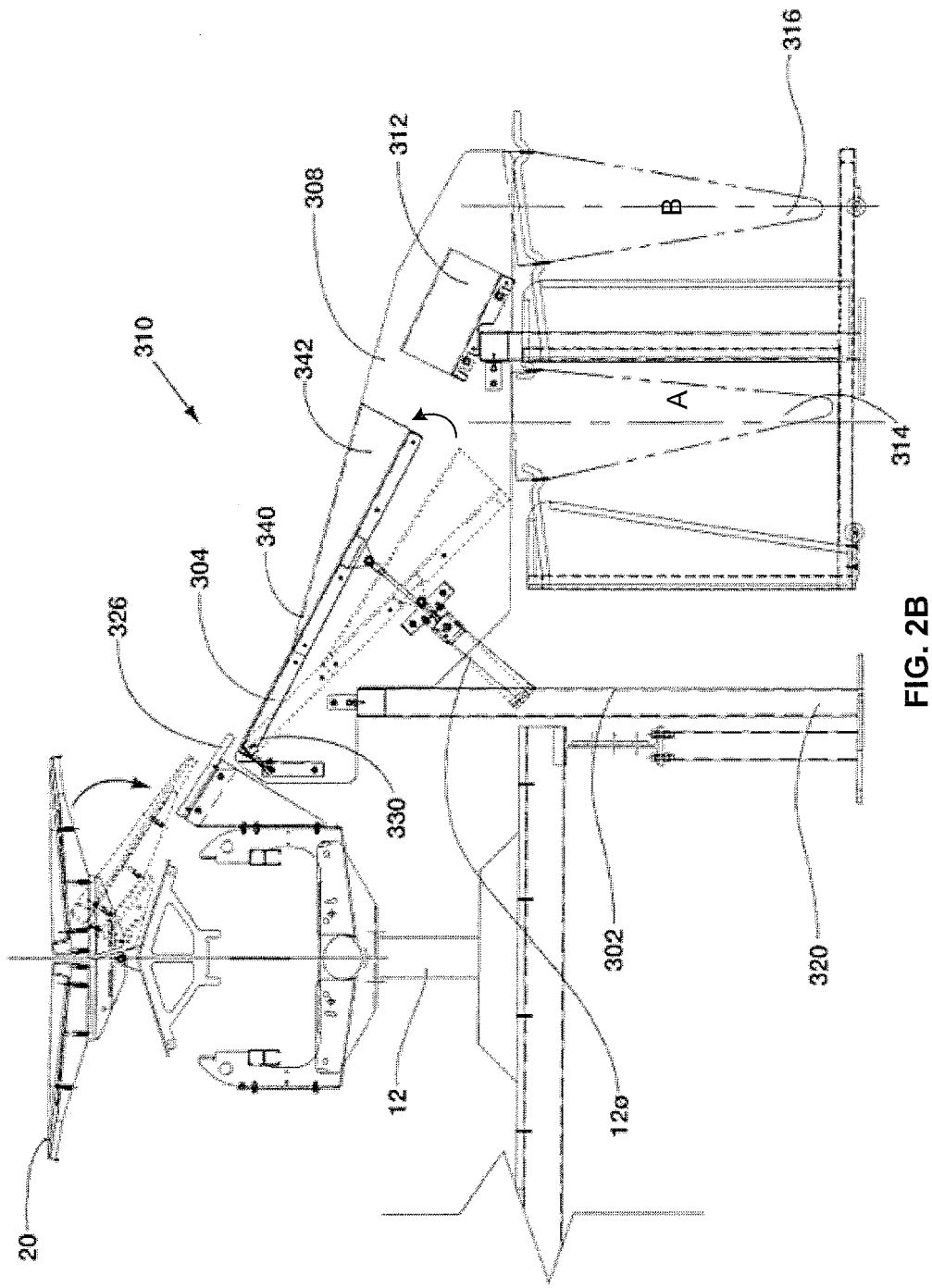
FIG. 2B is a side view of the embodiment of FIG. 1, where a dual-position chute is positioned adjacent to the line of conveyor carts, previously introduced in FIG. 1, in a second vertical discharge position.

Referring now to the drawings in general, and FIGS. 1, 2A and 2B in particular, it will be understood that the illustrations are for the purpose of describing embodiments of the inventions and are not intended to limit the inventions or any invention thereto. As best seen in FIG. 1, a sorting conveyor is shown embodied according to the present inventions for transporting and sorting packages or other objects. Typically, the sorting conveyor includes a train of individual carts 20, connected end to end, which may form an endless loop around a closed conveyor track 12. Alternately, the conveyor carts 20 of the present inventions herein could be used singly or as part of a finite train. Generally, the package sorting conveyor 10 includes four major sub-assemblies: a conveyor track 12; an opposed roller motor assembly 70; the train of tilting conveyor carts 20, which are moved along the conveyor track 12 by an opposed roller motor assembly 70; and a tilting mechanism 80 for tilting the conveyor carts 20 to discharge packages 11 therefrom, as described in U.S. Pat. No. 6,367,610 entitled HIGH EFFICIENCY SORTING CONVEYOR, issued Apr. 2, 2002, which is hereby incorporated by reference in its entirety.

In some embodiments, each cart 20 may be built around a base trailer frame structure to which other components of each cart 20 are mounted. Mounted atop the trailer frame structure of each conveyor cart 20 may be a tiltable support apparatus, which supports the carrying tray thereabove. In particular examples, the tiltable support supports the carrying tray above the trailer frame structure and allows tilting of the carrying tray toward either side of the sorting conveyor 10, for instance to unload a package into one of the unloading stations, for instance a transition zone dual-position chute as described hereinafter.

One embodiment of a transition zone dual-position chute 310 is introduced in FIGS. 2A and 2B according to the present inventions. FIG. 2A illustrates the transition zone dual-position chute embodiment in a first discharge position, while FIG. 2B illustrates the embodiment in a second discharge position. As shown, dual-position chute 310 generally diverts parcel packages/objects from cart 20 between a first substantially vertical discharge (i.e. as illustrated in FIG. 2A as the first discharge position) and at least one spatially-separated, second substantially vertical discharge (i.e. illustrated in FIG. 2B as the second discharge position). However, other embodiments include diverting packages/objects between three or more substantially vertical discharge locations, i.e. in three or more discharge positions.

As shown in FIGS. 2A and 2B, dual-position chute 310 may include an inlet 326 to receive a package from cart 20; a diverter door, e.g. a positionable diverter door 304, to orient the chute between at least two discharge positions; and at least one stationary diverter door 312 to divert the package to at least one pre-determined second discharge. As introduced above, the pre-determined discharge may include a variety of vertical discharges with respect to the particular packer assembly and other conveying system characteristics appreciated by those skilled in the art. As shown, dual position chute 310 may be generally supported by a fixed base assembly 302. Typically, dual position chute 310 guides small parcel packages/objects from the discharge of cart 20 to a collector assembly, i.e. first collector 314 and second collector 316 as illustrated in FIGS. 2A and 2B.

Fixed base assembly 302 may include a variety of shapes, styles and sizes of foundations to support the intended sorting application. For example, the fixed base assembly 302 may support the transition zone dual-position chute 310 substantially perpendicularly adjacent to the conveying system, i.e. cart's 20, for parcel handling, and in particular small parcel vertical discharge and packing. As shown in FIGS. 2A and 2B, some examples of fixed base assembly 302 include chute supports 320, which may generally support the positionable diverter door 304 about the stationary diverter door 312. For instance, a plurality of chute supports 320 may position the inlet 326 adjacent to the positionable diverter door 304 so that the positionable diverter door 304 may freely move relative to the inlet 326, yet securely receive packages from the inlet 326. As shown in FIGS. 2A and 2B, the chute support 320 may spatially separate the inlet 326 and the positionable diverter door 304. Further, the plurality of chute supports 320 may position at least one stationary diverter door 312 in alignment with the positionable diverter door 304. Typically, the plurality of chute supports 320 align the stationary diverter door 312 in at least one secondary discharge position, i.e. to discharge objects into the second collector 316.

Typically, chute supports 320 sufficiently space positionable diverter door 304 and at least one stationary diverter door 312 to allow the small parcel packages/objects to fit into the collector assembly in a first position, i.e. the first collector 314 as illustrated herein. Other examples include alternative arrangements of fixed base 302 to align and support positionable diverter door 304 and at least one stationary diverter door 312. Similarly, chute supports 320 sufficiently space at least one stationary diverter door 312 relative to the positionable diverter door 304 to allow the small parcel packages/objects to fit into the collector assembly in a second position, i.e. the second collector 316 as illustrated herein.

Additional examples include a variety of fixed base 302 arrangements to align and support at least one stationary diverter door 312 relative to the positionable diverter door 304. Yet other examples of the fixed base assembly 302 space the positionable diverter door 304 and at least one stationary diverter door 312 in a variety of configurations to match the desired collector assembly configuration. Further, the size of each independent collector may be larger/smaller in proportion to the collector assembly than illustrated herein. Therefore, the fixed base assembly 302 will provide any appropriate spacing between the diverter doors to correspond to the package/object dimensions and collection characteristics for any particular package-sorting application.

FIGS. 2A and 2B further show inlet 326 secured to the conveying assembly and adjacent to the cart 20 at an unloading station for receiving a package. As shown, the cart 20 in a titling position will discharge a package from the conveying system onto inlet 326. Typically, inlet 326 is fixedly secured in a permanent position to direct the packages onto the dual position chute 310. As illustrated in FIG. 2, the inlet 326 is substantially flat to receive the package discharged from the package sorting conveyor system. For instance, the proximate entrance of the inlet 326 is wider than a front edge of a package being sorted to ensure the package is properly fed and retained on the dual position chute 310. In this regard, the inlet 326 provides a wide range of curvature, enabling the package to generally slide off the cart 20 when the chute 310 is aligned substantially perpendicular, or the like, with the conveying system. The package is then fed onto the inlet 326 and onto the positionable diverter door 304.

In other examples, the length and width of the inlet 326 will vary to match the corresponding size of packages being sorted in the sorting application. In yet further examples, the inlet 326 may be secured independently of the conveying system frame. Regardless of the inlet dimensions, the inlet is generally aligned adjacent to the cart's 20 horizontal movement and to the positionable diverter door 304, as shown and described herein.

FIGS. 2A and 2B also show the diverter door 304 located between the inlet 326 and the stationary diverter door 312 for selectively diverting a package between a first discharge and a spatially separated second discharge. The positionable diverter door 304 may have an upper low-friction, wear-resistant discharge surface 340. In particular examples, the discharge surface 340 is a high-density polyethylene. However, other examples include a variety of low-friction surfaces to match the package's coefficient of friction, the weight and dimensions of the package, and the like to meet the intended sorting application.

As introduced in FIG. 2A, the diverter door 304 also includes an inclined diverting surface 342 downstream from its proximate entrance for receiving and maintaining the package on the diverting surface 340 until the package is discharged into the collector system or has passed to the stationary diverter door 312. The inclined diverting surface 342 may be a raised plane, for instance a triangular plane as discussed hereinafter. However, other examples include a variety of raised sectional shapes that may be integral with diverter door 304. Typically, the inclined diverting surface 342 is substantially wider at a distal exit than at a proximate entrance to properly retain the package on the surface during the package's travel across the diverter door 304. For instance, the speed of the packages coming off the sorting system is dampened by the inclined diverting surface 342. In yet other examples, the substantially perpendicular directional movement of the discharged packages coming off the sorting system is overcome by the inclined diverting surface 342 to retain the package on the intended surface.

As additionally introduced in FIGS. 2A and 2B, at least one stationary diverter door 312 is located between the diverter door 304 and the collector system. The stationary diverter door 312 is sized to accept and orient a package from the diverter door 304 to the collection system, for instance to the second collector 312 as shown. Thus, the stationary diverter door 312 is spatially separated downstream from the positionable diverter door 304. As shown in FIG. 2A, the stationary diverter door 312 is non-planar with the positionable diverter door 304 in a first discharge position. Similarly, as shown in FIG. 2B, the stationary diverter door 312 is substantially planar with the positionable diverter door 304 in a second discharge position to align the diverter door 304 and the stationary diverter door 312 in a substantially planar orientation.

A collection assembly generally collects the discharged packages from the dual position chute 310. FIGS. 2A and 2B show one embodiment of a collection assembly having a first collector 314 and an independent second collector 316. Typically, the first collector 314 is vertically adjacent to the positionable diverter door 304. Similarly, the second collector 316 is vertically adjacent to at least one stationary diver door 312. In particular examples, the positionable diverter door 304 sorts packages by directing related objects, designated A, into the first collector 314, while the stationary diver door 312 directs different objects, designated B, into the second collector 316. Typically, the packages are gravity-fed into the collector assembly. However, those of ordinary skill in the art would appreciate additional collection systems to sort and organize a variety of packages to meet the needs of the particular sorting application.

FIG. 3 is a side view of one embodiment of a dual position chute 310, wherein the inlet 326 accepts packages moving in a generally horizontal direction along the sorting conveyor. However, those of ordinary skill will appreciate the movement of the sorting conveyor may include slight vertical movements to match the particular sortation or packing needs. As introduced above, the sidewall assembly 322 and the inclined diverting surfaces retain the package on the dual position chute 310 when being discharged from the conveying system and sorted into the collector assembly. As illustrated in FIG. 3, the sidewall assembly 322 may include a downstream sidewall and an upstream sidewall that both as a secondary boundary to retain the packages on the chute. For instance, an upstream sidewall 352 may span substantially the length of the chute, i.e. from the inlet 326 to the second collector 316. Additionally, a downstream sidewall 354 may extend substantially downstream from the positionable diverter door to the second collector 316. For instance, as shown in FIG. 3, the downstream sidewall 354 may extend from the base of the inclined diverting surface 342 to the second collector 316, or beyond.

Also shown in FIG. 3, the stationary diverter door 312 has an upper discharge surface 318 to feed the package into the collector assembly. For instance, the stationary diverter door 312 may have a low-friction, wear-resistant upper discharge surface 318. In particular examples, the discharge surface 318 is a high-density polyethylene. However, other examples include a variety of low-friction surfaces to match the package's coefficient of friction, the package's weight, dimensions and the like. Further, the diverter door 304 and the stationary diverter door 312 are spatially separated from one-another as shown and described herein. For instance, as shown in FIG. 3, a spacer 308 is a void between the two doors to spatially separate the positionable diverter door 304 and said at least one stationary diverter door 312. Therefore, the positionable diverter door 304 is selectively positionable along at least two non-parallel axes. Other examples include multiple spacers for embodiments having more than two stationary diverter doors, and/or multiple corresponding collector systems, and thus more than two non-parallel axes.

Figure 4:
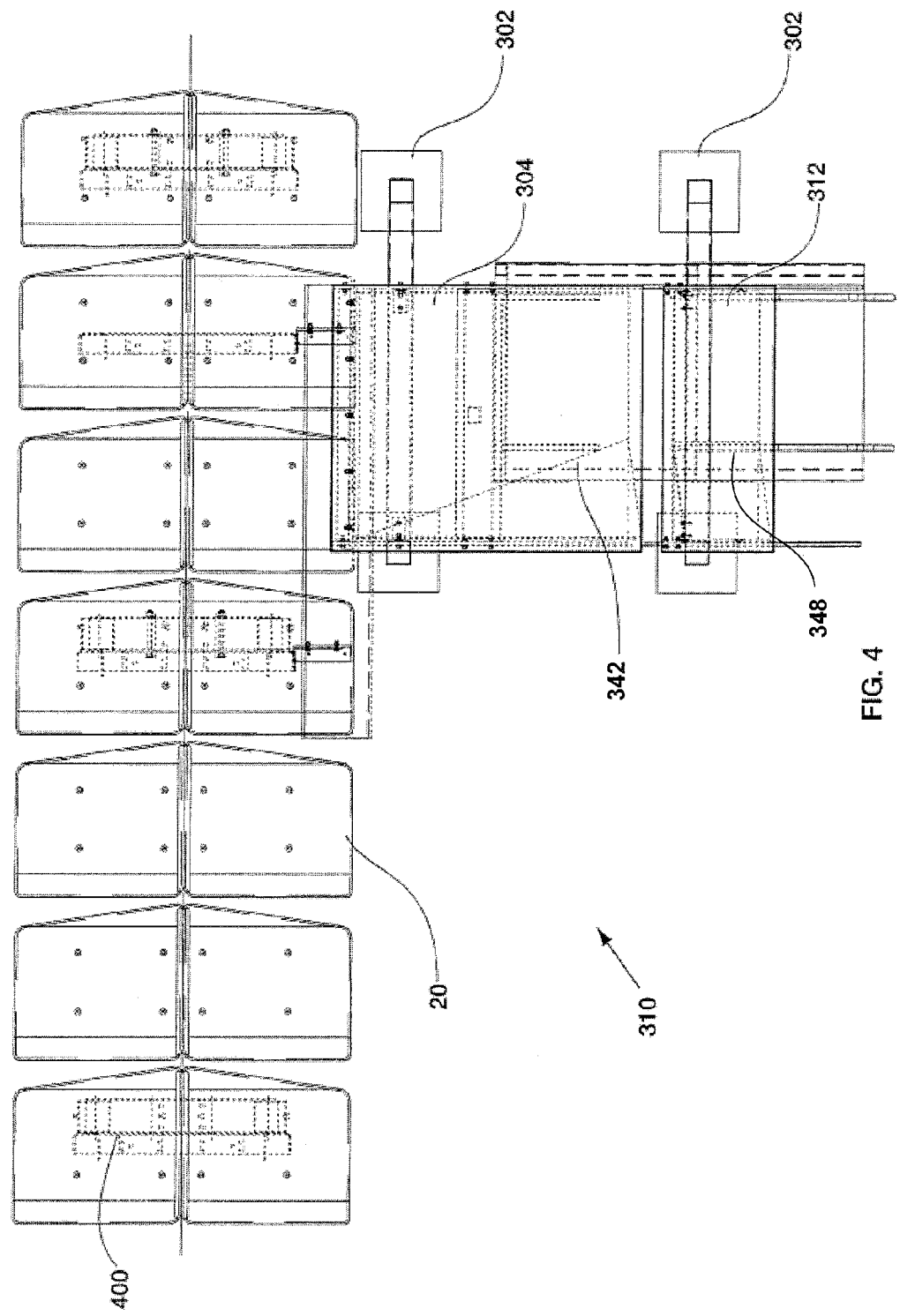
FIG. 4 is a top view of a dual-position chute embodiment introduced in FIG. 2A.

FIG. 4 shows another example of dual position chute 310 that is supported by the base foundation 302 and is substantially perpendicular to the conveying system. As shown in this orientation, a package may be discharged from the cart 20, for instance from a tipping assembly 400, onto the inlet. Thereafter, the positionable diverter door 304 passes the package to either the collector assembly, i.e. the first collector, or to the stationary diverter door 312. The inclined diverting surface 342 assists this package movement after it is discharged from the inlet. Similarly, if the package is passed to the stationary diverter door, the stationary inclined diverting surface 348 assists the downstream package movement until it reaches the collector assembly, as described herein.

Figure 5:
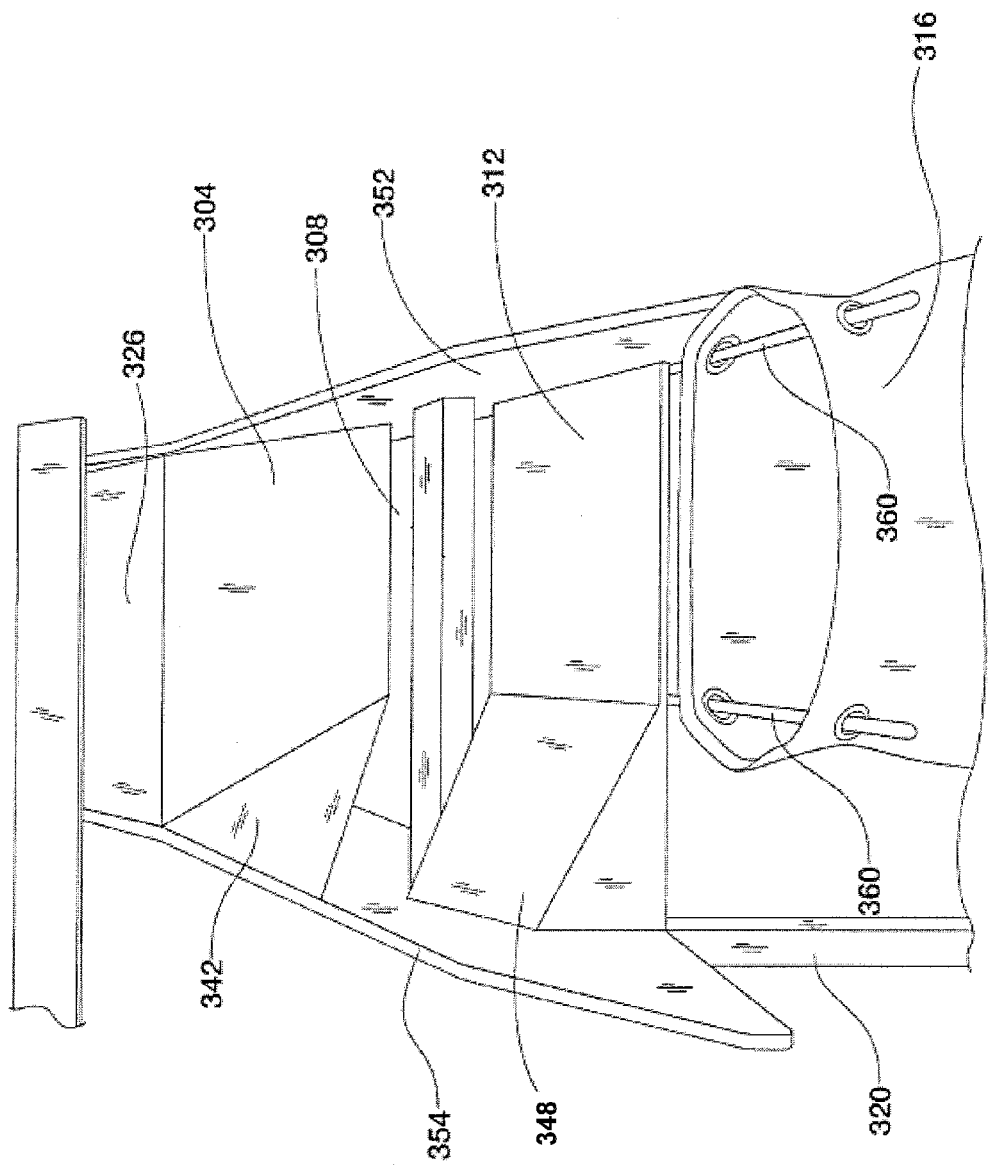
FIG. 5 is a front perspective view of one embodiment of a dual position chute.

FIG. 5 illustrates the chute assembly's ability to discharge packages into the first collector 314 in a first lower path, and alternatively, discharge packages into the second collector 316 on a second upper path. The positionable diverter door 304 typically has a low-friction, wear-resistant upper surface for guiding the packages across its surface. The diverter door's 304 discharge surface includes an inclined diverting surface 342 downstream from its proximate entrance. As shown in this particular example, the inclined diverting surface 342 may be a raised triangular plane. Typically, the inclined diverting surface 342 is substantially wider at a distal exit than at a proximate entrance to properly orient the package during travel across the diverter door 304.

The stationary diverter door 312 is spatially separated downstream from the positionable diverter door 304. Typically, the stationary diverter door 312 includes a low-friction, wear-resistant discharge surface. As shown in FIG. 5, the stationary diverter door's 312 discharge surface includes an inclined diverting surface 348 downstream from its proximate entrance. As shown in this particular example, the inclined diverting surface 342 may be a raised triangular plane.

A collection assembly is positioned at the vertical discharge at the first and second position to accept the gravity-fed packages exiting the positionable diverter door 304 and the stationary diverter door 312, respectively. The collection assembly may be removably affixed to the chute, or may be permanently positioned at the discharge locations. FIG. 5 illustrates one example of a removable collection assembly, wherein the collectors are removably secured at their corresponding discharge positions. As shown, the second collector 316 is generally threaded through the collector support assembly 360, which can be removed, emptied and re-threaded into position. Other embodiments include a variety of configurations to removably support the collectors relative to the discharge positions.

Figure 6A:
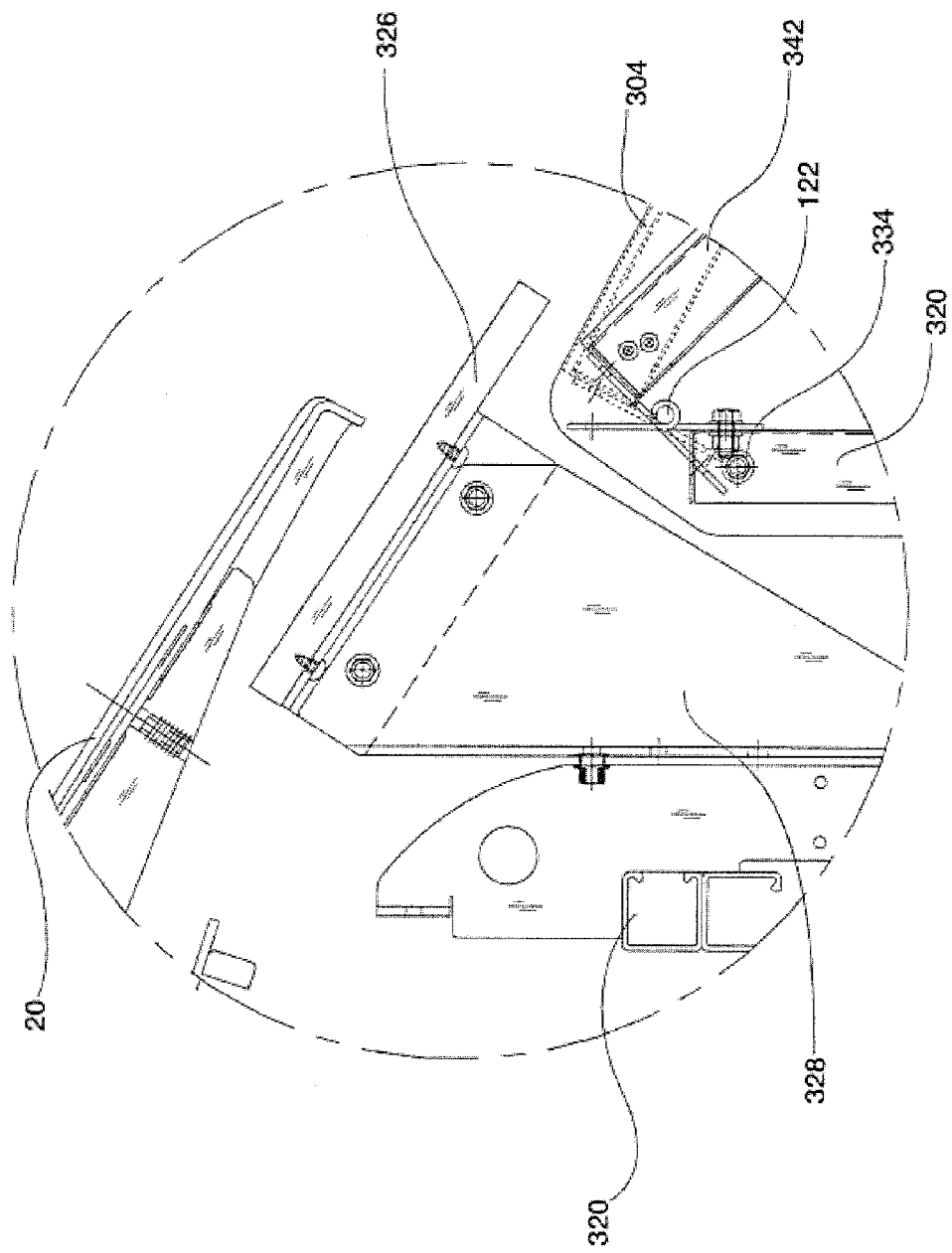
FIG. 6A is a side, isolated view of a multi-positionable diverter door embodiment in a first discharge position.

FIG. 6A shows one embodiment of the dual position chute 310 with the diverter door 304 hinged about chute support 320 in a first discharge position. Further, the inlet foundation 328 may be affixed to the chute support 320 to generally support the inlet 326, which initially guides the package along this first discharge path. As shown in FIG. 6A, a positioner assembly may selectively position the diverter door between a first discharge position, i.e. illustrated as the lower path, and at least one spaced second discharge position, i.e. that is correspondingly illustrated as the upper path in FIG. 6B. An example of positioner assembly components useful in embodiments herein are described in U.S. Pat. No. 6,715,599 entitled CONVEYOR SYSTEM HAVING AN IMPROVED CHUTE, issued Apr. 6, 2004, which is hereby incorporated by reference in its entirety. In some examples, positioner assembly 120 includes at least one pivot point 334. The pivot point 334 may be on the chute support assembly 320, at the connection with the diverter door and/or a combination thereof. Further, the pivot point may be a ball joint, an inclined axis and/or a combination thereof. In some examples, the pivot point includes two independent pivots, for instance a rotary joint and a hinged joint.

Figure 6B:
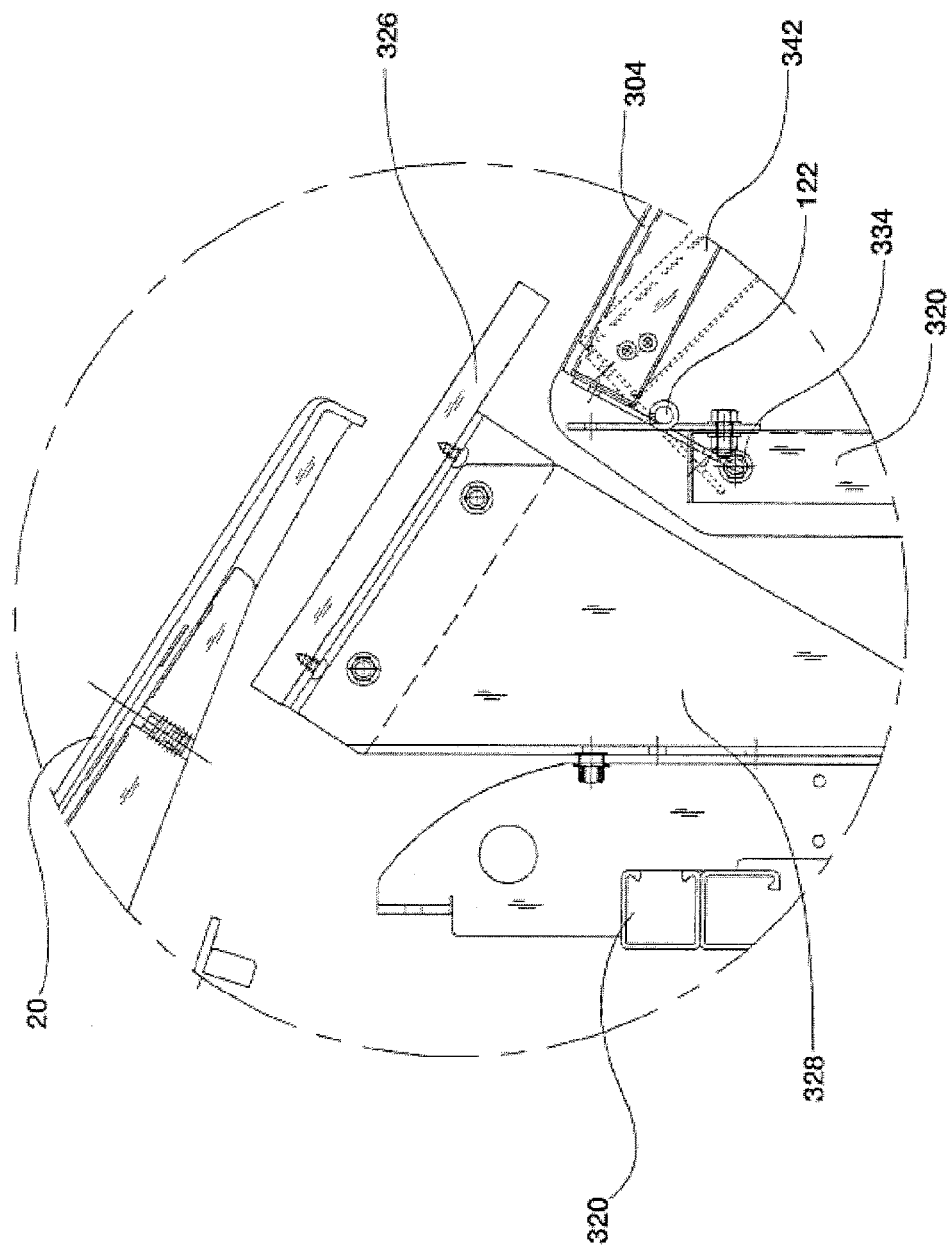
FIG. 6B is a side, isolated view of a multi-positionable diverter door embodiment in a second discharge position.

FIG. 6B shows one embodiment of the dual position chute 310 wherein the diverter door 304 is hinged about the chute support 320 in a second discharge position. Typically, the stationary diverter door (not shown) accepts a package from the diverter door 304 in this position along a generally upper path into a second collection assembly as described herein.

Figure 7:
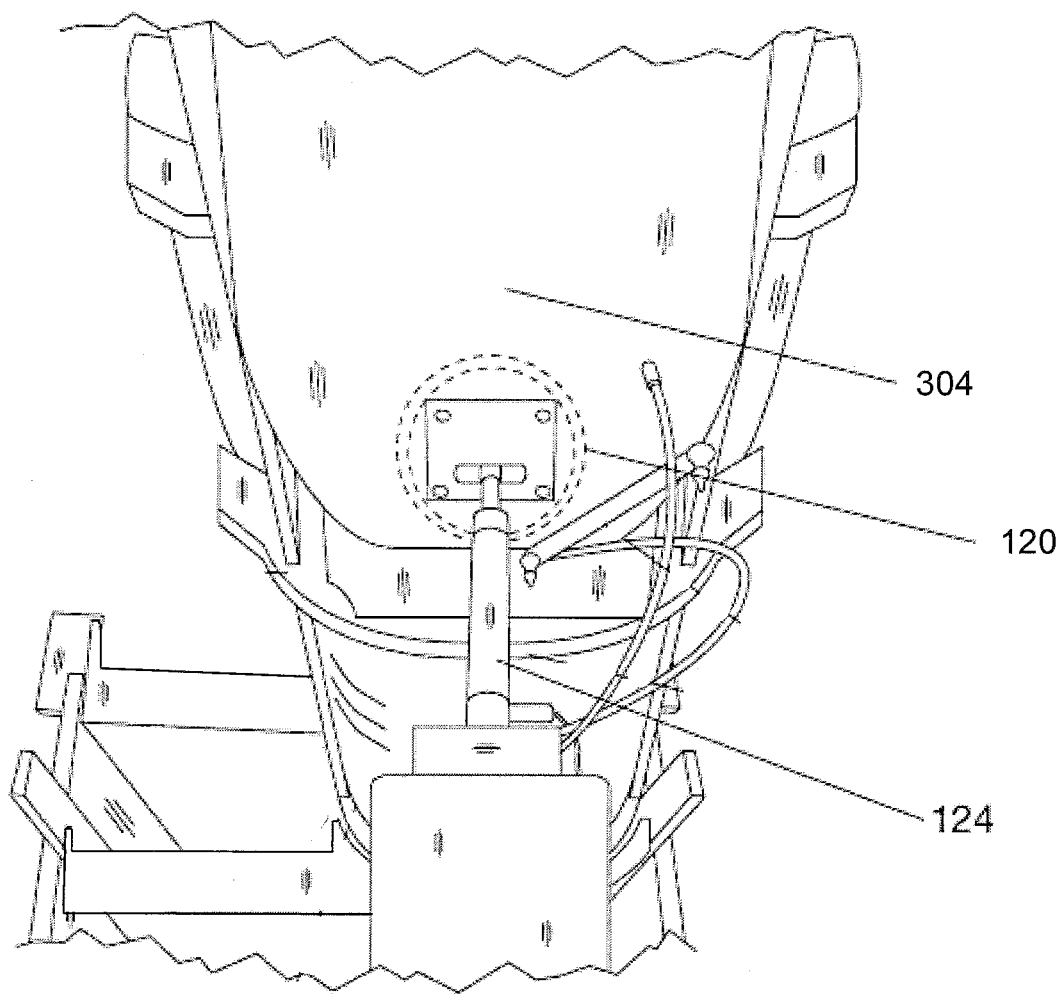
FIG. 7 is a bottom, rear view of a positioner assembly adapted to selectively position the dual-position chute between a first vertical discharge position and at least one second discharge position.

For illustrative purposes only, FIG. 7 shows one embodiment of a positioner assembly 120 to move the positionable diverter door 304 about an axis to orient the chute between a first and second substantially vertical discharge positions. In some examples, one end of the positionable assembly 120 may be affixed to vertical support assembly 320, while the opposing end is affixed to the positionable diverter door 304. However, in other examples, positionable assembly 120 may be secured to the assembly in a variety of configurations independent of vertical support assembly 320. A drive assembly may drive positioner assembly 120 between the multiple discharge positions. The drive assembly may be a linear actuator, for instance a fluid actuator, or the like. In yet other examples, positioner assembly 120 may selectively position the diverter door between more than two discharge positions.

Typically, the transition zone dual-position chute 310 discharges small parcel packages/objects substantially vertically into a collection assembly that is free of secondary downstream chutes. However, in yet alternative examples, a dual-position chute may include multiple secondary downstream chutes as seen in U.S. Pat. No. 7,597,185 entitled CONVEYOR AND AIR FILM CHUTE, issued Oct. 3, 2009, which is hereby incorporated by reference in its entirety. For instance, four secondary downstream chutes may be adjacent to the conveyor track. At the top of the secondary downstream chutes may be a dual position chute, e.g. any of the embodiments of the dual position chute shown and described herein. In some examples, the inlet of the dual position chute may be the side of the chute closest to the conveyor track, for instance where packages enter the chute. The dual position chute may also include an upwardly inclined downstream wall, for instance for guiding packages into the funnel. Any of the secondary chutes may include a low-friction, curved surface. Further, in yet additional alternative embodiments, the conveying system may comprise a cross belt replacing the train of individual carts to convey the packages and other objects around a closed conveyor track Numerous characteristics and advantages have been set forth in the foregoing description, together with details of structure and function. Many of the novel features are pointed out in the appended claims. The disclosure, however, is illustrative only, and changes may be made in detail, especially in matters of shape, size and arrangement of parts, within the principle of the disclosure, to the full extent indicated by the broad general meaning of the terms in which the general claims are expressed. It is further noted that, as used in this application, the singular forms "a," "an," and "the" include plural referents unless expressly and unequivocally limited to one referent.

We claim:

1. A transition zone dual-position chute for receiving a package discharged at an unloading station by a package sorting conveyor system having a conveyor track, said transition zone dual-position chute comprising:
   (a) an inlet adjacent to said conveying track at said unloading station for receiving said package;
   (b) a positionable diverter door; and
   (c) at least one stationary diverter door spatially separated downstream by at least one vertical collector from said positionable diverter door.

2. The apparatus according to claim 1, wherein said inlet is substantially flat to receive said package discharged by said package sorting conveyor system.

3. The apparatus according to claim 1, wherein said inlet is wider than a front edge of said package providing a wide range of curvature enabling said package to slide off said conveyor track and onto said inlet.

4. The apparatus according to claim 1, wherein said positionable diverter door includes a downstream discharge surface.

5. The apparatus according to claim 4, wherein said positionable diverter door includes an inclined diverting surface.

6. The apparatus according to claim 5, wherein said wherein said inclined diverting surface is substantially wider at a distal exit than at a proximate entrance.

7. The apparatus according to claim 4, wherein said discharge surface includes a low-friction, wear-resistant discharge surface.

8. The apparatus according to claim 7, wherein said discharge surface is a high-density polyethylene.

9. The apparatus according to claim 1, wherein said positionable diverter door is selectively positionable between at least two non-parallel axes.

10. The apparatus according to claim 1, wherein said stationary diverter door is non-planar with said positionable diverter door in a first discharge position.

11. The apparatus according to claim 1, wherein said stationary diverter door is substantially planar with said positionable diverter door in a second discharge position.

12. The apparatus according to claim 1, wherein said stationary diverter door includes a discharge surface.

13. The apparatus according to claim 12, wherein said discharge surface includes a stationary inclined diverting surface.

14. The apparatus according to claim 13, wherein said stationary inclined diverting surface is substantially wider at a distal exit than at a proximate entrance.

15. The apparatus according to claim 12, wherein said stationary diverter door discharge surface includes a low-friction, wear-resistant discharge surface.

16. The apparatus according to claim 15, wherein said discharge surface is a high-density polyethylene.

17. The apparatus according to claim 1, wherein a spacer spatially separates said positionable diverter door and said at least one stationary diverter door.

18. The apparatus according to claim 1, further including a sidewall assembly.

19. The apparatus according to claim 18, wherein said sidewall assembly includes an upstream sidewall extending substantially along the length of said chute.

20. The apparatus according to claim 18, wherein said sidewall assembly includes a downstream sidewall extending substantially downstream of said positionable diverter door.

21. The apparatus according to claim 1, further including a fixed base assembly supporting said chute.

22. The apparatus according to claim 21, wherein said base assembly includes chute supports.

23. The apparatus according to claim 1, further including a collector assembly positioned adjacent to said positioner diverter door and said at least one stationary diverter door.

24. The apparatus according to claim 23, wherein said collector assembly includes a first collector vertically adjacent to said positionable diverter door.

25. The apparatus according to claim 23, wherein said collector assembly includes a second collector vertically adjacent to said at least one stationary diver door.

\* \* \* \* \*

UNITED STATES PATENT AND TRADEMARK OFFICE
CERTIFICATE OF CORRECTION

PATENT NO. : 8,919,529 B1  
APPLICATION NO. : 13/614579  
DATED : December 30, 2014  
INVENTOR(S) : Erceg et al.

Page 1 of 1

It is certified that error appears in the above-identified patent and that said Letters Patent is hereby corrected as shown below:

In the Specification

In Column 6, line 66, 312 should read "314"

In Column 7, line 15, diver should read "diverter"

In Column 7, line 18, diver should read "diverter"

In Column 7, line 24, there should be a "." after the word application

In the Claims

In Column 10, line 17, the second occurrence of "wherein said" should be deleted Signed and Sealed this  
Fourteenth Day of April, 2015

Michelle K. Lee  
*Director of the United States Patent and Trademark Office*